(12) United States Patent
Kishi et al.

(10) Patent No.: US 11,048,245 B2
(45) Date of Patent: Jun. 29, 2021

(54) INDICATOR DETECTION SYSTEM AND INDICATOR DETECTION METHOD

(71) Applicants: MITSUBISHI HEAVY INDUSTRIES, LTD., Tokyo (JP); Mitsubishi Hitachi Power Systems, Ltd., Yokohama (JP)

(72) Inventors: Makoto Kishi, Tokyo (JP); Shintaro Kumano, Tokyo (JP); Katsuhiko Abe, Yokohama (JP); Keisuke Yamamoto, Tokyo (JP); Yukihiko Inoue, Tokyo (JP); Shun Niizuma, Tokyo (JP)

(73) Assignees: MITSUBISHI HEAVY INDUSTRIES, LTD., Tokyo (JP); MITSUBISHI POWER, LTD., Yokohama (JP)

( * ) Notice: Subject to any disclaimer, the term of this patent is extended or adjusted under 35 U.S.C. 154(b) by 0 days.

(21) Appl. No.: 16/495,304

(22) PCT Filed: Mar. 23, 2018

(86) PCT No.: PCT/JP2018/011769
§ 371 (c)(1),
(2) Date: Sep. 18, 2019

(87) PCT Pub. No.: WO2018/181020
PCT Pub. Date: Oct. 4, 2018

(65) Prior Publication Data
US 2020/0103883 A1    Apr. 2, 2020

(30) Foreign Application Priority Data
Mar. 29, 2017    (JP) .............................. JP2017-066125

(51) Int. Cl.
*G05B 23/02*    (2006.01)
*G06N 3/04*    (2006.01)
*G06F 11/07*    (2006.01)

(52) U.S. Cl.
CPC ........... *G05B 23/02* (2013.01); *G06N 3/0454* (2013.01); *G06F 11/0751* (2013.01)

(58) Field of Classification Search
CPC .. G05B 23/02; G05B 23/0243; G06N 3/0454; G06N 3/0445; G06N 3/08; G06N 20/00; G06F 11/0751; G06F 11/3447
(Continued)

(56) References Cited

U.S. PATENT DOCUMENTS 10,113,443 B2 * 10/2018 Masuda .................... F02C 7/04
10,408,707 B2 *  9/2019 Mori .................. G05B 23/0243
(Continued)

FOREIGN PATENT DOCUMENTS

JP    H06-167591 A    6/1994
JP    H07-281714 A    10/1995
(Continued)

OTHER PUBLICATIONS

International Search Report dated Jun. 19, 2018, issued in counterpart Application No. PCT/JP2018/011769, with English translation. (4 pages).
(Continued)

*Primary Examiner* — Nam V Nguyen
(74) *Attorney, Agent, or Firm* — Westerman, Hattori, Daniels & Adrian, LLP

(57) ABSTRACT

An indicator detection system includes: a data acquiring unit configured to acquire operation data of a machine and operation history data indicating an operation history of the machine; an estimation unit configured to calculate a first estimated value of a parameter of the machine which is to be monitored on the basis of the operation data, the operation history data and an estimation model for estimating a value of the parameter at a time point corresponding to the operation history data for the parameter; and a state evalu-
(Continued)

ating unit configured to evaluate a state of the machine on the basis of a difference between the first estimated value of the parameter from the estimation unit and a measured value or a second estimated value of the parameter included in the operation data acquired by the data acquiring unit.

12 Claims, 11 Drawing Sheets

(58) Field of Classification Search
USPC ........ 340/3.1; 702/183, 185, 179; 714/3, 48, 714/736
See application file for complete search history.

(56) References Cited

U.S. PATENT DOCUMENTS

| | | | | |
|---|---|---|---|---|
| 10,496,466 | B2* | 12/2019 | Zhao | G06F 17/153 |
| 10,534,328 | B2* | 1/2020 | Ganti | G05B 13/048 |
| 10,626,748 | B2* | 4/2020 | Chandra | F01D 21/003 |
| 10,671,039 | B2* | 6/2020 | Herzog | G05B 19/0426 |
| 10,678,912 | B2* | 6/2020 | Mestha | H04L 63/14 |
| 2004/0148129 | A1* | 7/2004 | Gotoh | G05B 23/0229 |
| | | | | 702/183 |
| 2005/0107984 | A1* | 5/2005 | Samata | F04C 18/18 |
| | | | | 702/183 |
| 2010/0174444 | A1 | 7/2010 | Hansson et al. | |
| 2011/0307220 | A1* | 12/2011 | Lacaille | G05B 23/024 |
| | | | | 702/185 |
| 2012/0283988 | A1* | 11/2012 | Pandey | G06Q 30/06 |
| | | | | 702/179 |
| 2013/0318018 | A1 | 11/2013 | Kalya et al. | |
| 2015/0185716 | A1* | 7/2015 | Wichmann | G05F 1/66 |
| | | | | 700/287 |
| 2016/0327417 | A1* | 11/2016 | Hara | G05B 23/0208 |
| 2018/0051853 | A1 | 2/2018 | Yashiki et al. | |

FOREIGN PATENT DOCUMENTS

| | | |
|---|---|---|
| JP | 2003-114294 A | 4/2003 |
| JP | 2006-318414 A | 11/2006 |
| JP | 2010-527089 A | 8/2010 |
| JP | 2015-209841 A | 11/2015 |
| JP | 2016-126728 A | 7/2016 |
| WO | 2016/147696 A1 | 9/2016 |

OTHER PUBLICATIONS

Written Opinion dated Jun. 19, 2018, issued in counterpart Application No. PCT/JP2018/011769, with English translation. (9 pages).

* cited by examiner

INDICATOR DETECTION SYSTEM AND INDICATOR DETECTION METHOD

TECHNICAL FIELD

The invention relates to an indicator detection system and an indicator detection method.

Priority is claimed on Japanese Patent Application No. 2017-66125, filed Mar. 29, 2017, the content of which is incorporated herein by reference.

BACKGROUND ART

In equipment such as power plants, a model such as an artificial neural network (ANN) may be used to monitor operating states of machines. For example, Patent Document 1 discloses that a current equipment state is simulated using a first ANN, an equipment state at the time of a normal operation is simulated using a second ANN, and it is determined whether a failure has occurred on the basis of a difference in output data between the first ANN and the second ANN.

CITATION LIST

Patent Literature

[Patent Document 1]
United States Patent Application, Publication No. 2013/0318018

SUMMARY OF INVENTION

Technical Problem

In general, in monitoring using the model described in Patent Document 1 or the like, process values acquired from a plant which is to be monitored or the like are compared with a normal model which is constructed by learning process values or the like indicating a normal state and an abnormality is detected when the actual process values depart from the normal model. In this case, data which is used to construct a normal model is generally data from the past. However, an actual plant deteriorates over time. Accordingly, when the normal model is not updated, the normal model departs from a normal state of the plant at the current time and monitoring accuracy based on the normal model deteriorates.

The invention provides an indicator detection system and an indicator detection method that can solve the above-mentioned problem.

Solution to Problem

According to a first aspect of the invention, there is provided an indicator detection system including: a data acquiring unit configured to acquire operation data of a machine and operation history data indicating an operation history of the machine; an estimation unit configured to calculate a first estimated value of a parameter of the machine which is to be monitored on the basis of the operation data, the operation history data and an estimation model for estimating a value of the parameter at a time point corresponding to the operation history data for the parameter; and a state evaluating unit configured to evaluate a state of the machine on the basis of a difference between the first estimated value of the parameter and a measured value or a second estimated value of the parameter included in the operation data acquired by the data acquiring unit.

In the indicator detection system according to a second aspect of the invention, the operation history data may include at least one of the number of times of starting and the number of times of stopping of the machine.

In the indicator detection system according to a third aspect of the invention, the operation history data may include at least one of an operation time of the machine, an operation time for each operation pattern of the machine, and an elapsed time after introduction of the machine.

In the indicator detection system according to a fourth aspect of the invention, the operation history data may include at least one of the number of times of performing maintenance and check on the machine and an elapsed time after maintenance and check on the machine has been performed.

In the indicator detection system according to a fifth aspect of the invention, the operation history data may include a cumulative output value of the machine.

In the indicator detection system according to a sixth aspect of the invention, the operation data may include at least one of alarm information and event information which are generated by a device that monitors the machine.

In the indicator detection system according to a seventh aspect of the invention, the estimation model may be constructed on the basis of operation data and operation history data of other machines of the same type as the machine in addition to the operation data and the operation history data of the machine.

The indicator detection system according to an eighth aspect of the invention may further include an estimation model constructing unit configured to construct the estimation model on the basis of the operation history data and the operation data of the machine at a time point corresponding to the operation history data.

In the indicator detection system according to a ninth aspect of the invention, the state evaluating unit may be configured to additionally acquire the operation history data and to evaluate a state of the machine on the basis of an evaluation criterion of the parameter which is to be monitored and which corresponds to operation results indicated by the operation history data.

In the indicator detection system according to a tenth aspect of the invention, the state evaluating unit may be configured to predict an abnormality which is to occur in the future on the basis of the difference and a correlation between a history of the difference and an abnormality which has actually occurred.

According to an eleventh aspect of the invention, there is provided an indicator detection system including a data acquiring unit configured to acquire operation data of a machine and operation history data indicating an operation history of the machine; are estimation unit configured to calculate a first estimated value of a parameter of the machine which is to be monitored on the basis of the operation data and an estimation model for estimating a value of the parameter at a time point corresponding to the operation history data for the parameter; and a state evaluating unit configured to evaluate a state of the machine on the basis of a difference between the first estimated value of the parameter estimated by the estimation unit and a measured value or a second estimated value of the parameter included in the operation data acquired by the data acquiring unit and an evaluation criterion of the parameter which is to be monitored and which corresponds to operation results indicated by the operation history data.

According to a twelfth aspect of the invention, there is provided an indicator detection method which is performed by an indicator detection system, the indicator detection method including: a step of acquiring operation data of a machine and operation history data indicating an operation history of the machine; a step of calculating a first estimated value of a parameter of the machine which is to be monitored on the basis of the operation data, the operation history data and an estimation model for estimating a value of the parameter at a time point corresponding to the operation history data for the parameter; and a step of evaluating a state of the machine on the basis of a difference between the first estimated value of the parameter and a measured value or a second estimated value of the parameter included in the operation data.

Advantageous Effects of Invention

With the indicator detection system and the indicator detection method, it is possible to detect an indicator in consideration of aging deterioration of a plant or the like.

DESCRIPTION OF EMBODIMENTS

First Embodiment

Hereinafter, an indicator detection system according to a first embodiment of the invention will be described with reference to FIGS. 1 to 7.

Figure 1:
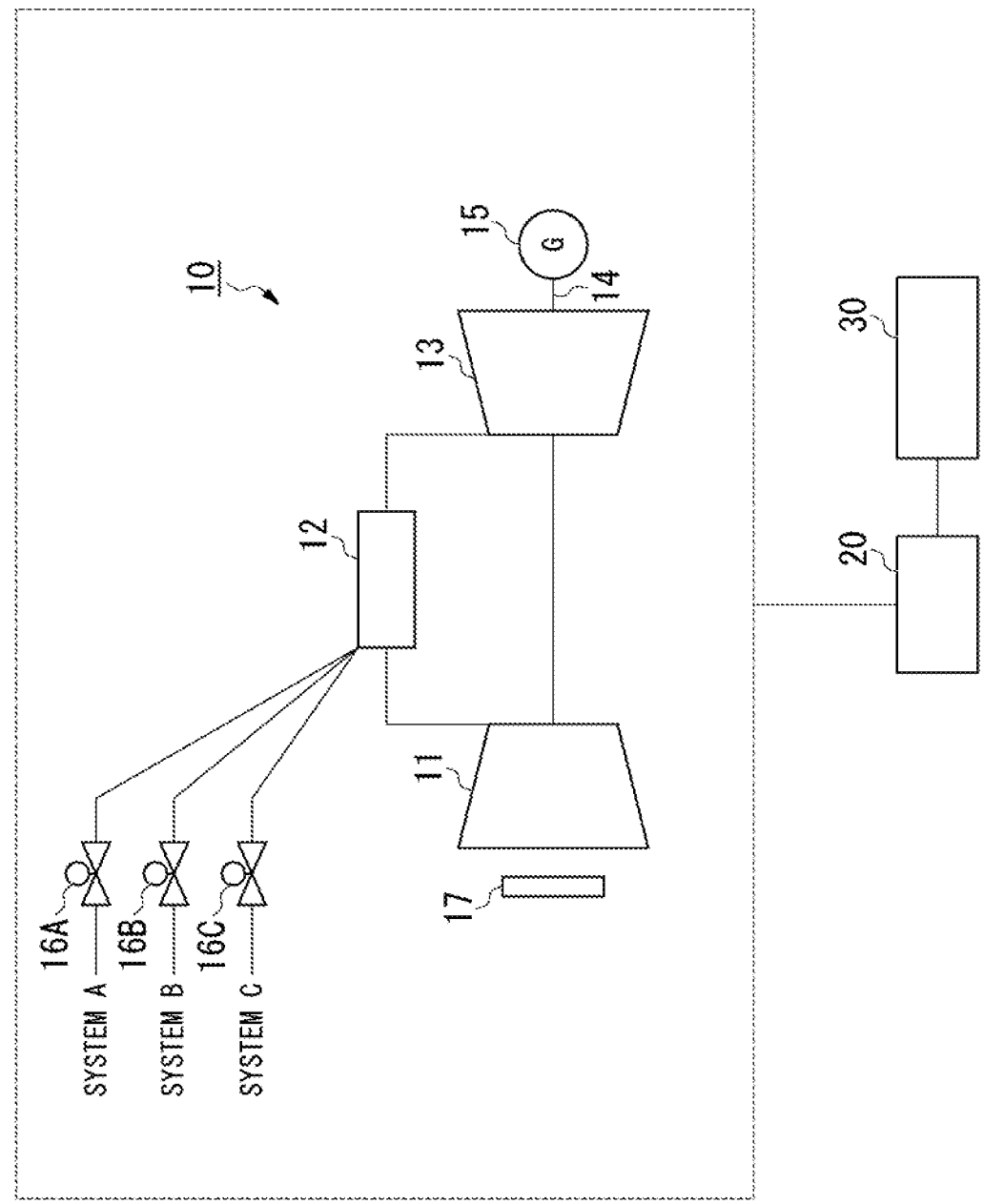
FIG. 1 is a diagram showing an example of a plant which is monitored using an indicator detection system according to the invention.

FIG. 1 is a diagram showing an example of a plant which is monitored using an indicator detection system according to the invention.

A gas turbine plant which is to be monitored and which is shown in FIG. 1 includes a gas turbine 10, a power generator 15, and a device 20 that controls Or monitors the operation of the gas turbine 10. The gas turbine 10 and the power generator 15 are connected to each other by a rotor 14. The gas turbine 10 includes a compressor 11 that compresses air and generates compressed air, a combustor 12 that combusts fuel gas in the compressed air and generates high-temperature combustion gas, and a turbine 13 that is driven by the combustion gas. The combustor 12 is connected to a fuel supply device (not shown) for each system A, B, or C that supplies fuel to the combustor 12. Fuel flow rate control valves 16A, 16B, and 16C that control flow rates of fuel of the systems A to C are provided between the fuel supply devices and the combustor 12. The device 20 is, for example, a control device which is constituted by one or more computers. The device 20 controls a flow rate of air flowing into the compressor 11 by adjusting an opening level of an inlet guide vane (IGV) 17 or controls an amount of fuel gas supplied to the combustor 12 by adjusting opening levels of the fuel flow rate control valves 16A to 16C, drives the turbine 13, and activates the power generator 15.

The device 20 acquires measurement data such as a temperature and a pressure from sensors provided at various positions on the gas turbine 10 or the power generator 15. The measurement data includes surrounding environment information such as a temperature of an operation environment in addition to physical properly data of a fuel gas, air, and the like which are introduced into the gas turbine 10 and Which are used for actual operation. The device 20 generates a control signal for controlling the gas turbine 10 using the acquired measurement data. The measurement data includes identification information of the sensors, measured values, and measurement times. The control signal includes a time at which the control signal is output. The device 20 may input the measurement data to a predetermined estimation model (for example, a calculation expression for calculating a state quantity of the gas turbine 10) and acquire an estimated value calculated by the estimation model instead of the measurement data or in addition to the measurement data. This estimated value may be referred to as a second estimated value. The measurement data (or the second estimated value) and the control signal are generically referred to as process data. The device 20 compares the acquired measurement data with a predetermined threshold value, and generates alarm information indicating that an abnormality has occurred in the gas turbine 10 or that attention needs to be paid to the gas turbine 10 when the measurement data is greater or less than the threshold value. When stopping or starting of the gas turbine 10, operation of a device in the gas turbine 10 (opening/closing of a valve), change of an operating state, or the like occurs, the device 20 generates event information indicating occurrence thereof. The alarm information and the event information include time information at which the information is generated. The device 20 causes a display device which is not shown to display the process data, the alarm information, and the event information, and an operator monitors the measurement data, the alarm information, and the like displayed on the display device and operates the gas turbine 10.

The device 20 transmits process data, alarm information, and event information to the indicator detection device 30. The device 20 transmits process data to the indicator detection device 30, for example, at predetermined intervals, whenever process data is acquired, or when a predetermined change occurs in a value of process data. The device 20 transmits alarm information and event information to the indicator detection device 30, for example, when the information is generated. In this embodiment, the device 20 includes a control device and a monitoring device which are required for operation of the gas turbine 10. On the other hand, the indicator detection device 30 is provided to detect an indicator of an abnormality which may occur in the gas turbine 10 in the future and to notify an operator of the detected indicator. Process data, alarm information, and event information are generically referred to as operation data.

The indicator detection device 30 detects an indicator of an abnormality which is to occur in the gas turbine 10. Particularly, the indicator detection device 30 according to this embodiment detects an indicator using a prediction model in which aging deterioration of the gas turbine 10 is reflected. The indicator detection device 30 will be described below.

Figure 2:
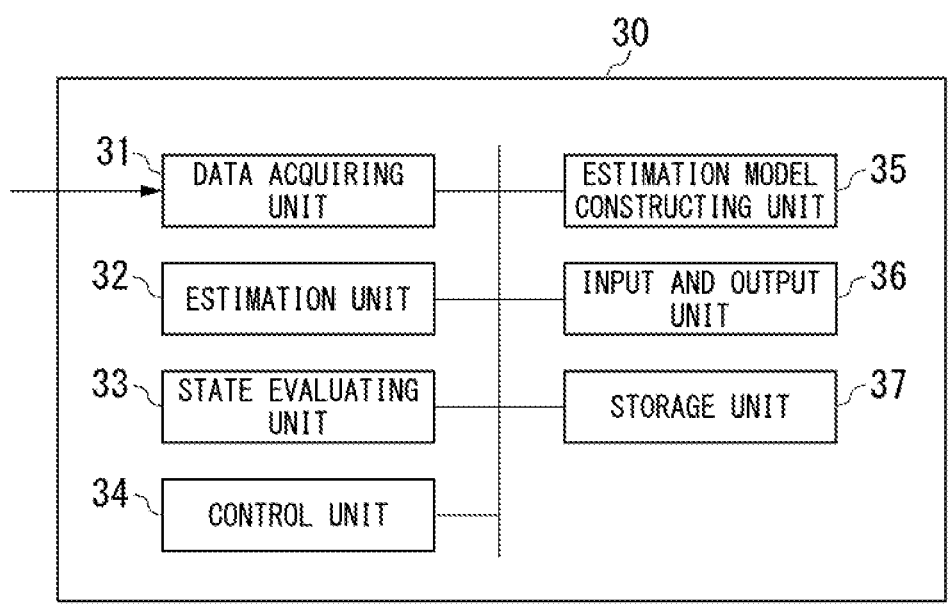
FIG. 2 is a functional block diagram showing an indicator detection device according to a first embodiment of the invention.

FIG. 2 is a functional block diagram showing an indicator detection device according to a first embodiment of the invention.

As shown in FIG. 2, the indicator detection device 30 includes a data acquiring unit 31, an estimation unit 32, a state evaluating unit 33, a control unit 34, an estimation model constructing unit 35, an input and output unit 36, and a storage unit 37.

The data acquiring unit 31 acquires operation data of a machine and operation history data indicating an operation history of the machine. Here, operation history data includes operation history data such as a cumulative operation time of the gas turbine 10, an operation time for each operation pattern, an elapsed time after the gas turbine 10 has been introduced and installed, the number of times of start, the number of times of stop, the number of times of starting and stopping, and a cumulative value of output results of the gas turbine 10 and maintenance history data such as the number of times of performing maintenance on the gas turbine 10 and an elapsed time after maintenance has been performed. The data acquiring unit 31 records the acquired operation data in the storage unit 37.

Operation history data can be calculated using process data such as an output of the power generator 15 and a start command signal and a stop command signal for the gas turbine 10, which indicates that the gas turbine 10 is operating. For example, regarding the cumulative operation time, the device 20 calculates an operation time from starting to stopping of one operation using the process data and accumulates the calculated operation time to calculate the cumulative operation time. For example, regarding the number of times of starting and stop, the device 20 counts the number of times of a start command and a stop command which are output therefrom and accumulates the counted number of times to calculate the number of times of starting and stop. The device 20 calculates the operation history data and the data acquiring unit 31 acquires operation history data from the device 20.

The device 20 stores history information of maintenance which was performed on the gas turbine 10 in the past, the device 20 calculates the cumulative number of times of maintenance, an elapsed time after maintenance has been performed, and the like, and the data acquiring unit 31 acquires the maintenance history data from the device 20.

The estimation unit 32 calculates an estimated value of a parameter on the basis of operation data, operation history data, and an estimation model for estimating a value of a monitoring parameter in which aging deterioration corresponding to an operation result indicated by the operation history data is reflected.

The state evaluating unit 33 evaluates the state of the gas turbine 10 which is indicated by a monitoring parameter on the basis of a difference between an estimated value (a first estimated value) of the monitoring parameter estimated by the estimation unit 32 and a measured value or an estimated value (a second estimated value) of the monitoring parameter of the gas turbine 10 acquired by the data acquiring unit 31. For example, when the difference is equal to or greater than a predetermined threshold value, the monitoring parameter is evaluated to represent an indicator of an abnormality which occurs in the gas turbine 10 or in a part thereof. When an indicator of an abnormality is detected, the state evaluating unit 33 calculates alarm information indicating that an indicator of an abnormality has been detected and abnormality information such as an abnormality occurrence rate and an abnormality occurrence position.

The control unit 34 variously controls start, stop, processing, and the like of the indicator detection device 30.

The estimation model constructing unit 35 learns operation history data and operation data at the time of a normal operation of a machine corresponding to the operation history data (at a time point at which an operation indicated by the operation history data has been performed) and constructs an estimation model for estimating a value of a monitoring parameter at the time of a normal operation of the gas turbine 10. The estimation model constructed by the estimation model constructing unit 35 is a model in which aging deterioration of the gas turbine 10 is explicitly reflected. An estimation model is a model based on various neural networks such as an ANN or various statistical techniques such as machine learning, deep learning, and multiple regression analysis.

The input and output unit 36 outputs an evaluation result or a calculation result of abnormality information from the state evaluating unit 33 to another device such as a display. The input and output unit 36 receives an input operation of instruction information for the indicator detection device 30 by an operator.

The storage unit 37 stores various data such as operation data.

Figure 3:
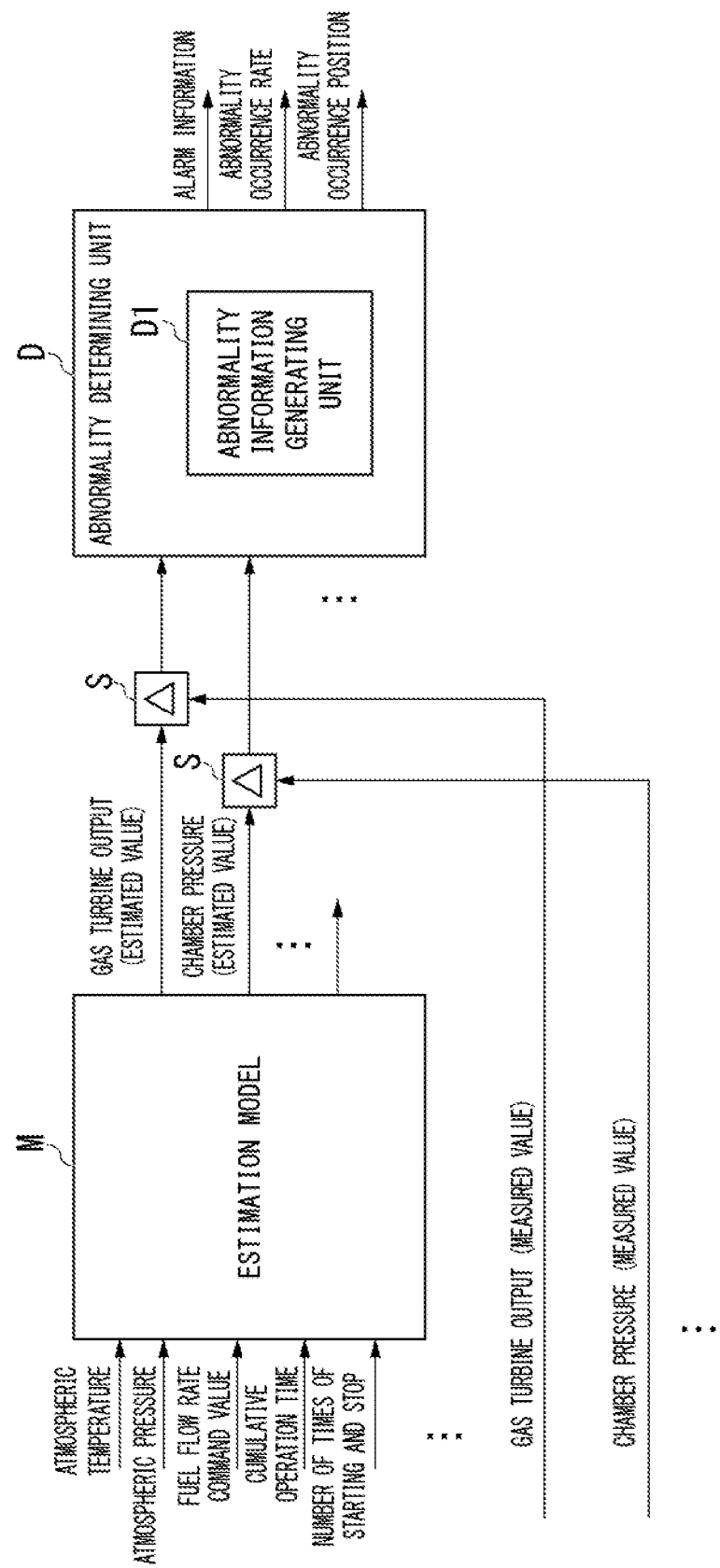
FIG. 3 is a diagram showing an indicator detecting process according to the first embodiment of the invention.

FIG. 3 is a diagram showing an indicator detecting process according to the first embodiment of the invention.

The estimation unit 32 includes an estimation model M. The estimation model M is, for example, a neural network model in which input parameters include an atmospheric temperature, an atmospheric pressure, a relative humidity, a fuel flow rate command value, fuel distribution ratio setting, the number of rotations of the gas turbine 10, valve opening levels of fuel flow rate control valves 16A to 16C, fuel supply pressures for systems A to C, an IGV opening level, an operation time, and the number of times of starting and stopping and output parameters include a gas turbine output, a gas turbine efficiency, a chamber pressure, manifold pressures of fuel systems, combustion vibration values of combustors, and an exhaust gas temperature from the turbine 13, on the basis of past operation data at the time of a normal operation.

The estimation unit 32 inputs parameters (such as the atmospheric temperature, the atmospheric pressure, and the fuel flow rate command value) required for estimation of monitoring parameters (such as the output of the gas turbine 10 and the chamber pressure) out of the operation data to the estimation model M. The estimation unit 12 inputs operation history data such as the cumulative operation time and the number of times of starting and stopping of the gas turbine 10 to the estimation model M. The estimation model M outputs an estimated value of the gas turbine output and an estimated value of the chamber pressure in which aging deterioration of the gas turbine 10 indicated by the cumulative operation time or the number of times of starting and stopping up to now is reflected. The estimation unit 32 outputs the estimated value from the estimation model M to the state evaluating unit 33.

The state evaluating unit 33 acquires the estimated value of the monitoring parameter such as the gas turbine output which is output from the estimation model M and the measured value of the current gas turbine output acquired by the data acquiring unit 31. The state evaluating unit 11 includes a subtractor S and an abnormality determining unit D. The subtractor S calculates a difference between the acquired estimated value from the estimation model M and the measured value of the corresponding, parameter. For example, the subtractor S calculates a difference between an estimated value of the gas turbine output and a measured value of the gas turbine output. The subtractor S calculates a difference between an estimated value of the chamber pressure and a measured value of the chamber pressure. The subtractor S outputs the calculated differences between the estimated values and the measured values of the monitoring parameters to the abnormality determining, unit D. The abnormality determining unit D compares the difference for each parameter with a difference threshold value determined for each parameter and determines whether there is an indicator of an abnormality. For example, the abnormality determining unit D compares the difference for the gas turbine output with the threshold value for the gas turbine output and determines that there is an indicator of an abnormality in the gas turbine output when the difference for the gas turbine output is greater than a predetermined threshold value. When the difference for the gas turbine output is equal to or less than the threshold value, the abnormality determining unit D determines that there is no indicator of an abnormality in the gas turbine output.

The abnormality determining unit D includes an abnormality information generating unit D1. The abnormality information generating unit D1 generates abnormality information such as alarm information indicating that an indicator of an abnormality has been detected and abnormality information such as an abnormality occurrence position and an abnormality occurrence rate. The alarm information includes information on details of the abnormality and the time at which it has been determined that there is an indicator of an abnormality. The abnormality information generating unit D1 may estimate a scale of an abnormality, a likelihood, a significance, or the like depending on the magnitude of the difference between the estimated value and the measured value, and add the information to the abnormality information. The abnormality information generating unit D1 determines at what position of the gas turbine 10 an abnormality occurs depending on the type of the monitoring parameter which is greater than the threshold value and estimates a position at which an abnormality is predicted to occur. The abnormality information generating unit D1 calculates an abnormality occurrence rate or a failure rate of the position at which an indicator of an abnormality has been detected on the basis of abnormality occurrence results and failure results in the past. Information of failure results in the past is stored in the storage unit 37. The abnormality information generating unit D1 may generate abnormality information on the basis of values of a plurality of monitoring parameters. For example, when two monitoring parameters including the gas turbine output and the chamber pressure are greater than the threshold values, the abnormality information generating unit D1 may generate alarm information such as an indicator of an "abnormality X."

In detection of an indicator based on a prediction model according to the related art, aging deterioration of a plant is not often considered and thus a value of a monitoring parameter which is estimated by the prediction model is often separated from an actual state of the plant which has operated for a certain period. On the other hand, in this embodiment, a value of a current output parameter of the gas turbine 10 based on aging deterioration is estimated on the basis of a predetermined estimation model. Then, it is determined whether the measured value of the output parameter of the gas turbine 10 is in a normal range using the estimated value as being true. Since determination of an abnormality is performed using a threshold value based on the current plant state, it is possible to detect an indicator with high accuracy.

An estimation model constructing process according to this embodiment will be described below.

Figure 4:
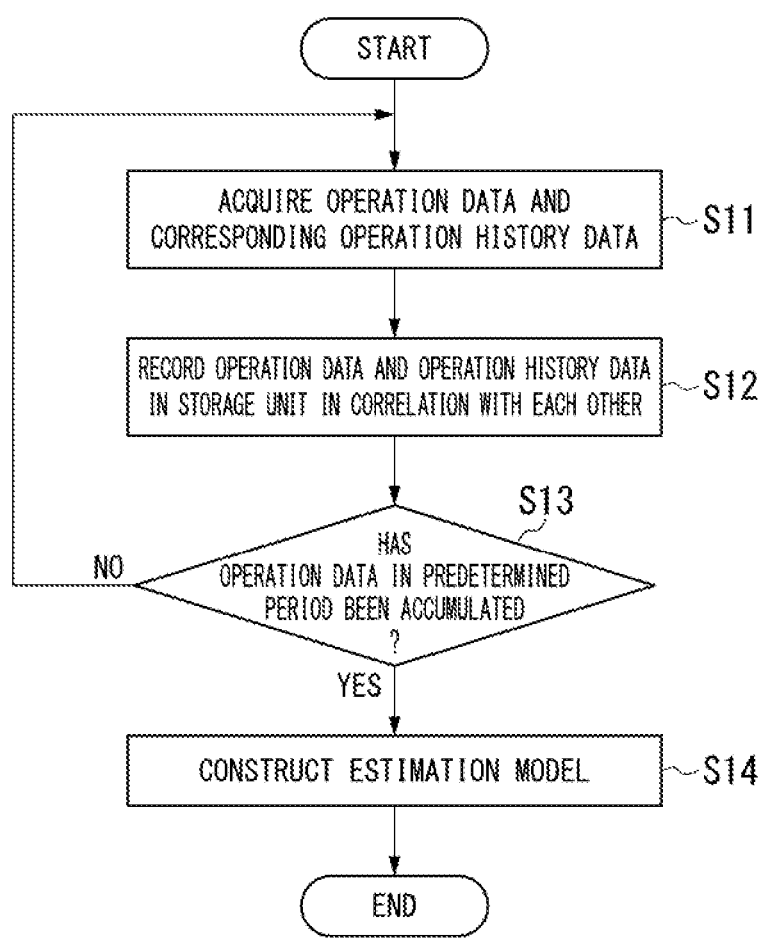
FIG. 4 is a flowchart showing an example of an estimation model constructing process according to the first embodiment of the invention.

FIG. 4 is a flowchart showing an example of an estimation model constructing process according to the first embodiment of the invention.

First, the data acquiring unit 31 acquires operation history data corresponding to operation data of a gas turbine 10 along with the operation data (Step S11). The operation history data corresponding to the operation data is, for example, a cumulative operation time or the number of times of starting and stopping up to hh:mm:ss on MM DD in YYYY (or a predetermined period before or after that time) when the operation data such as an atmospheric temperature X, a fuel flow rate command value Y, and an output Z of the gas turbine 10 is operation data which is measured by a sensor or output by the device 20 at hh:mm:ss on MM DD in YYYY. The acquired operation data is operation data at the time of a normal operation in the past which is taken in the gas turbine 10 which is to be monitored. Examples of the operation history data include an operation time for each operation pattern, the number of times of starting or an operation frequency, an elapsed time after the gas turbine 10 has been provided, a cumulative output value (MWh) of the gas turbine 10 after the gas turbine has been introduced, the number of times of performing maintenance and check, and an elapsed time after maintenance and check has been performed in addition to the cumulative operation time and the number of times of starting and stop. The operation time for each operation pattern is, for example, a cumulative operation time in a rated operation, a cumulative operation time in a partial-load operation, or a cumulative operation time at the time of change in load. For example, the operation time for each operation pattern is a cumulative operation time when an operation is started in each start pattern, where an operation pattern is classified into a hot start pattern (for example, in which a stopped time is less than 8 hours), a warm start pattern (for example, in which a stopped time is less than 24 hours), and a cold start pattern (for example, in which a stopped time is greater than 24 hours). Examples of the number of times of starting for each operation pattern include the cumulative number of times of hot start, the cumulative number of times of warm start, and the cumulative number of times of cold start. For example, the operation frequency for each operation pattern indicates what number of times each of hot start, warm start, and cold start has been performed in a predetermined period, for example, from a date and time at which the operation data has been taken. The elapsed time after the gas turbine 10 has been provided is an elapsed time including the operation time and the stopped time after the gas turbine 10 has been provided. The number of times of performing maintenance and check is the total number of times including the number of times of periodic check, the number of times of maintenance or replacement of components, and the number of times of component upgrade up to the date and time at which the corresponding operation data has been taken. The number of times of maintenance and check for each check position or each component which has been checked may be used as the number of times of performing maintenance and check. The elapsed time after maintenance and check has been performed is, for example, an elapsed time after periodic check has been first or last performed or an elapsed time after replacement of a certain component has been last performed when a plurality of times of check or replacement have been performed for the component.

Then, the data acquiring unit 31 stores the acquired operation data and the acquired operation history data which correspond to each other in the storage unit 37 in correlation with each other (Step S12).

Then, the estimation model constructing unit 35 determines whether operation data corresponding to a predetermined period required for constructing an estimation model or the like has been stored in the storage unit 37 (Step S13). When the operation data has not been stored (NO in Step S13), the process routine is repeated from Step S11. When the operation data corresponding to the predetermined period or the like has been stored (YES in Step S13), the estimation model constructing unit 35 constructs an estimation model M (Step S14). For example, the estimation model constructing unit 35 constructs an estimation model that outputs monitoring parameters (such as a gas turbine output and a chamber pressure) out of the operation data when input parameters (such as an atmospheric temperature, an atmospheric pressure, and a fuel flow rate command value) of operation data α and corresponding operation history data (such as a cumulative operation time and the number of times of starting and stop) as for the operation data α and the corresponding operation history data β input to the estimation model using an ANN or the like. The estimation model constructing unit 35 stores the constructed estimation model M in the storage unit 37. A flow of an online indicator detecting process using the constructed estimation model M will be described below.

Figure 5:
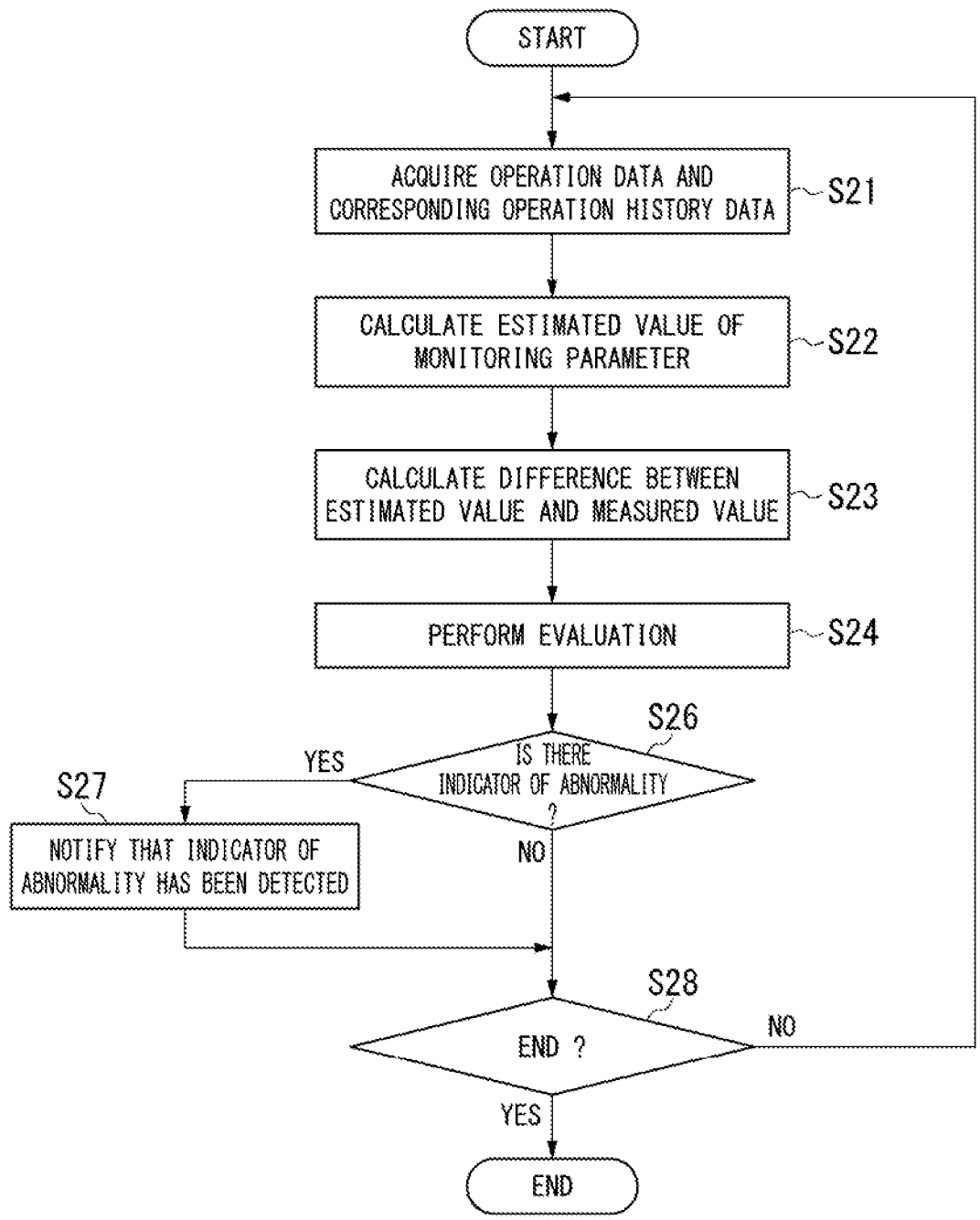
FIG. 5 is a flowchart showing an example of the indicator detecting process according to the first embodiment of the invention.

FIG. 5 is a flowchart showing an example of the indicator detecting process according to the first embodiment of the invention.

First, the data acquiring unit 31 acquires operation data of a gas turbine 10 in operation (Step S21). For example, the data acquiring unit 31 acquires latest measured values (such as an atmospheric temperature, an atmospheric pressure, an output of the gas turbine 10, and a chamber pressure) measured by various sensors via the device 20. The data acquiring unit 31 acquires values of latest control signals (such as an IGV opening level, a fuel flow rate command value, and valve opening levels of fuel systems) instructed by the device 20 from the device 20. The operation data which is acquired by the data acquiring unit 31 includes input parameters and monitoring parameters (output parameters). The data acquiring unit 31 acquires operation history data (such as a cumulative operation time, the number of times of starting and stop, and an elapsed time after periodic check) corresponding to the acquired operation data from the device 20.

The data acquiring unit 31 outputs the input parameters of the acquired operation data and the operation history data to the estimation unit 32. The data acquiring unit 31 outputs the monitoring parameters of the acquired operation data to the state evaluating unit 33.

Then, the estimation unit 32 reads an estimation model M from the storage unit 37 and inputs the operation data (input parameters) and the operation history data acquired from the data acquiring unit 31 to the read estimation model M. The estimation model M calculates estimated values of the monitoring parameters using the input values (Step S22). The estimation unit 32 outputs the estimated values of the monitoring parameters to the state evaluating unit 33.

Them the state evaluating unit 33 calculates a difference between the estimated value of, a monitoring parameter acquired from the estimation unit 32 and the measured value of the monitoring parameter acquired from the data acquiring unit 31 (Step S23). For example, the subtractor S of the state evaluating unit 33 subtracts the measured value of the gas turbine output from the estimated value of the gas turbine output. The subtractor S outputs the calculated difference to the abnormality determining unit D of the state evaluating unit 33. The subtractor S similarly calculates a difference for another monitoring parameter and outputs identification information of the monitoring parameter (for example, the name of the monitoring parameter) and the difference to the abnormality determining unit D in correlation with each other.

Then, the state evaluating unit 33 evaluates the monitoring parameters on the basis of the differences between the estimated values and the measured values. For example, the abnormality determining unit D compares the difference for each monitoring parameter calculated by the subtractor S with a predetermined threshold value which is determined for each monitoring parameter. The abnormality determining unit D determines that there is an indicator of an abnormality when the difference is greater than the threshold value, and determines that there is no indicator of an abnormality when the difference is less than the threshold value.

When it is determined that there is an indicator of an abnormality (YES in Step S26), the state evaluating unit 33 notifies that an indicator of an abnormality has been detected via the output unit 104 (Step S27). For example, the abnormality information generating unit D1 generates alarm information including the name of the monitoring parameter which is determined to exhibit an indicator of an abnormality and an abnormal occurrence time. For example, the abnormality information generating unit D1 identifies an abnormality occurrence position on the basis of the monitoring parameter and generates information indicating the abnormality occurrence position. For example, the abnormality information generating unit D1 calculates the number of times of occurrence of alarm on the basis of past alarm information or calculates an abnormality occurrence rate or the like at the abnormality occurrence position on the basis of past abnormality information, and generates information indicating the abnormality occurrence rate. The state evaluating unit 33 may determine whether there is an indicator of an abnormality using a plurality of monitoring parameters. For example, the state evaluating unit 33 may determine that there is an indicator of an abnormality K1' when a difference for a monitoring parameter K1 is greater than a threshold value, and determine that there is an indicator of an abnormality K2' when the difference for the monitoring parameter K1 and a difference for a monitoring parameter K2 are greater than the corresponding threshold values. Information for correlating a monitoring parameter with an abnormality occurrence position, past alarm information, past abnormality information for each abnormality occurrence position, and the like are stored in the storage unit 37. The state evaluating unit 33 outputs the alarm information, the abnormality occurrence rate, information of the abnormality occurrence position, and the like generated by the abnormality information generating unit D1 to the input and output unit 36. The input and output unit 36 displays the alarm information or the like on a display which is connected to the indicator detection device 30.

When it is determined that there is no indicator of an abnormality (NO in Step S26), the indicator detection device 30 determines whether the indicator detecting process is to be ended (Step S28). For example, when an operator inputs a process stop command to the indicator detection device 30 via the input and output unit 36, the control unit 34 determines that the indicator detecting process is to be ended. When it is determined that the indicator detecting process is to be ended (YES in Step S28), the control unit 34 stops the indicator detecting process. In this case, this flowchart ends. When the indicator detecting process continues to be performed (NO in Step S28), the process routine is repeated from Step S21.

An abnormality of which an indicator is detected in Step S24 is, for example, an event which is likely to be determined as occurrence of an abnormality by the device 20 after several hours in the future. Alternatively, the abnormality is an event which is likely to require maintenance with an operation stopped after several months in the future. With the indicator detection device 30 according to this embodiment, it is possible to estimate a value of a monitoring parameter in consideration of aging deterioration of a plant by constructing an estimation model or calculating an estimated value, for example, using a cumulative operation time as operation history data. In addition to simply the cumulative operation time, an operation load, operation conditions, or the like in the meantime is conceived to affect deterioration of a machine, and a value of a monitoring parameter in which an influence of an operation load of a plant is reflected can be estimated by performing construction of an estimation model or calculation of an estimated value, for example, using a cumulative output value of a gas turbine, an operation time for each operation pattern, or the like as the operation history data. A value of a monitoring parameter in which a degree of deterioration or fatigue of a plant or the like is reflected can be estimated by performing construction of an estimation model or calculation of an estimated value, for example, using the number of times of starting and stop, an operation frequency, the number of times of maintenance, and an elapsed time from maintenance as the operation history data. That is, since a value of a monitoring parameter is estimated using an estimation model M using various types of operation history data as parameters, it is possible to perform estimation in consideration of current circumstances of a plant. Accordingly, it is possible to detect an indicator with high accuracy. In the above description, an estimation model M is used to detect an indicator, but may be used to determine an abnormality for current operation data of a plant. The state evaluating unit 33 may determine an abnormality occurrence probability or may evaluate an operation state of a plant by steps such as "good," "normal," and "slightly higher load" and notify an operator of the steps even when there is no particular indicator of an abnormality, as well as simply determine whether there is an indicator of an abnormality.

As input parameters to the estimation model M, alarm information or event information generated by the device 20 may be added to the operation data in addition to the process data (the measurement data and the control signal).

Figure 6:
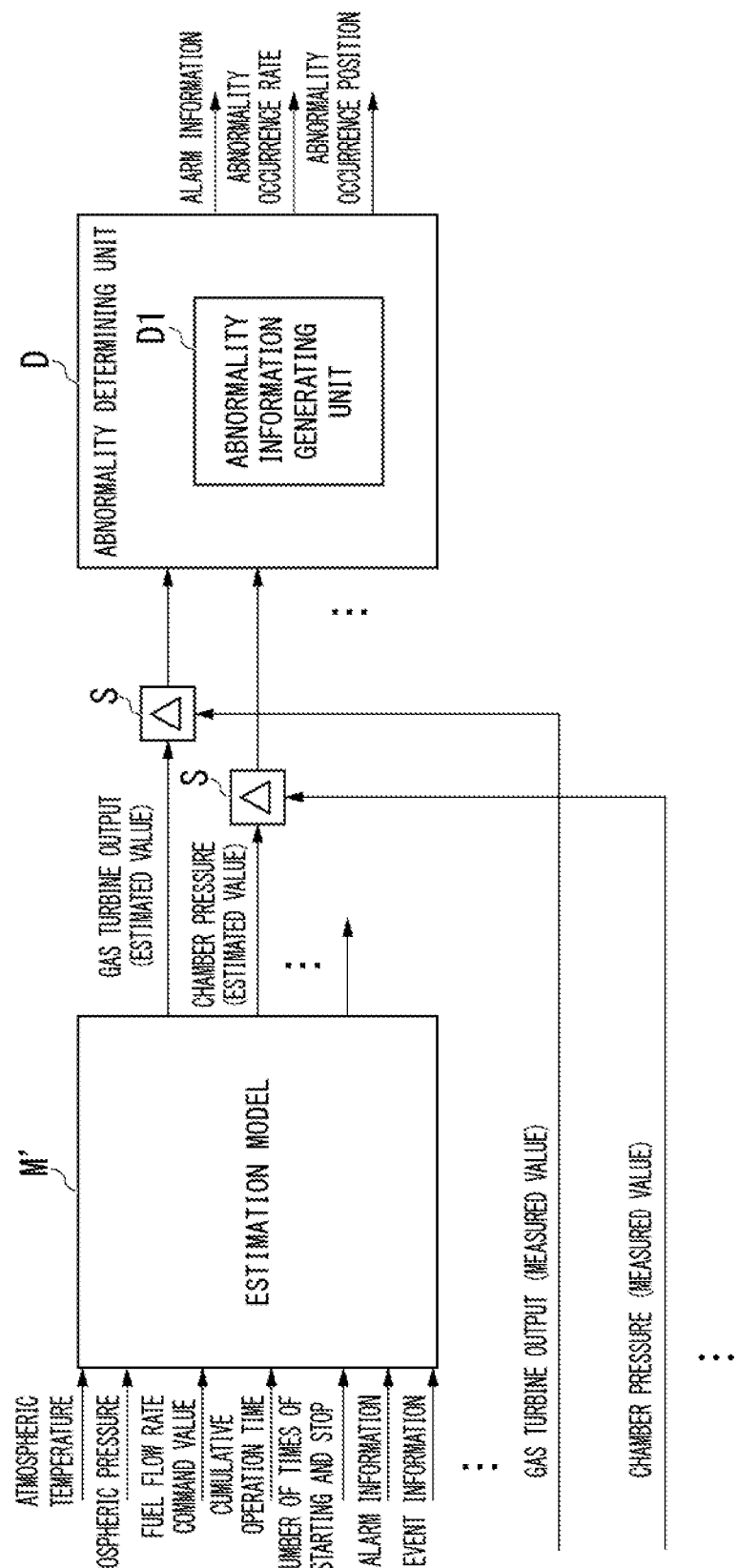
FIG. 6 is a diagram showing another example of the indicator detecting process according to the first embodiment of the invention.

FIG. 6 is a diagram showing another example of the indicator detecting process according to the first embodiment of the invention.

In a modified example of the first embodiment shown in FIG. 6, alarm information and event information in addition to the input parameters described above with reference to FIG. 3 are input to an estimation model M'. The estimation model constructing unit 35 acquires input parameters including alarm information and event information and constructs an estimation model. At this time, when a learning technique (such as a recurrent neural network (RNN)) of learning past time-series change is used, time-series process data, alarm information, and event information can be input as the operation data. When a model not learning time-series change is used, for example, alarm information or event information which is generated in a predetermined tune may be input to construct an estimation model M'.

In the configuration shown in FIG. 6, in the indicator detecting process, the data acquiring unit 31 acquires alarm information and event information in addition to the input parameters described above with reference to FIG. 3, and the estimation unit 32 estimates values of monitoring parameters in which occurrence circumstances of alarm information and event information are reflected in addition to the cumulative operation time or the like. For example, even when the values of the input parameters such as the atmospheric temperature, the fuel flow rate command value, and the cumulative operation time are the same, there is a likelihood that the monitoring parameters will be greatly different between a situation in which alarm information is generated and a situation in which alarm information is not generated. Even when the values of the input parameters such as the atmospheric temperature, the fuel flow rate command value, and the cumulative operation time are the same, there is a likelihood that operations of machines (event information) which are likely to have no relationship at a first glance will indirectly affect each other and thus the values of the monitoring parameters will be affected. With the estimation model M' shown in FIG. 6, it is possible to estimate values of monitoring parameters in consideration of a relationship of alarm information or event information which has not been considered up to now.

In the above description, both alarm information and event information are used, but only one thereof may be used.

It is preferable that an amount of learning data which is used to construct, the estimation models M and M' be as large as possible. Accordingly, the estimation models M and M' may be constructed by adding operation data and operation history data which are taken from the same type of plants and machines in addition to the operation data and the operation history data which are taken from a plant which is to be monitored to the operation data of the plant which is to be monitored.

In the indicator detection device 30 shown in FIG. 2, the indicator detection device 30 includes the estimation model constructing unit 35, but a configuration not including the estimation model constructing unit 35 may be employed. In this case, for example, an estimation model M is constructed by another computer and the estimation model M is stored in the storage unit 37.

The indicator detection device 30 may be used to predict a state of a plant in the future. For example, when change of a value indicated by a certain monitoring parameter can be predicted, it may help estimation of a process speed of deterioration or a replacement timing of a component associated with the monitoring parameter, planning of a maintenance schedule of the component, and the like.

Figure 7:
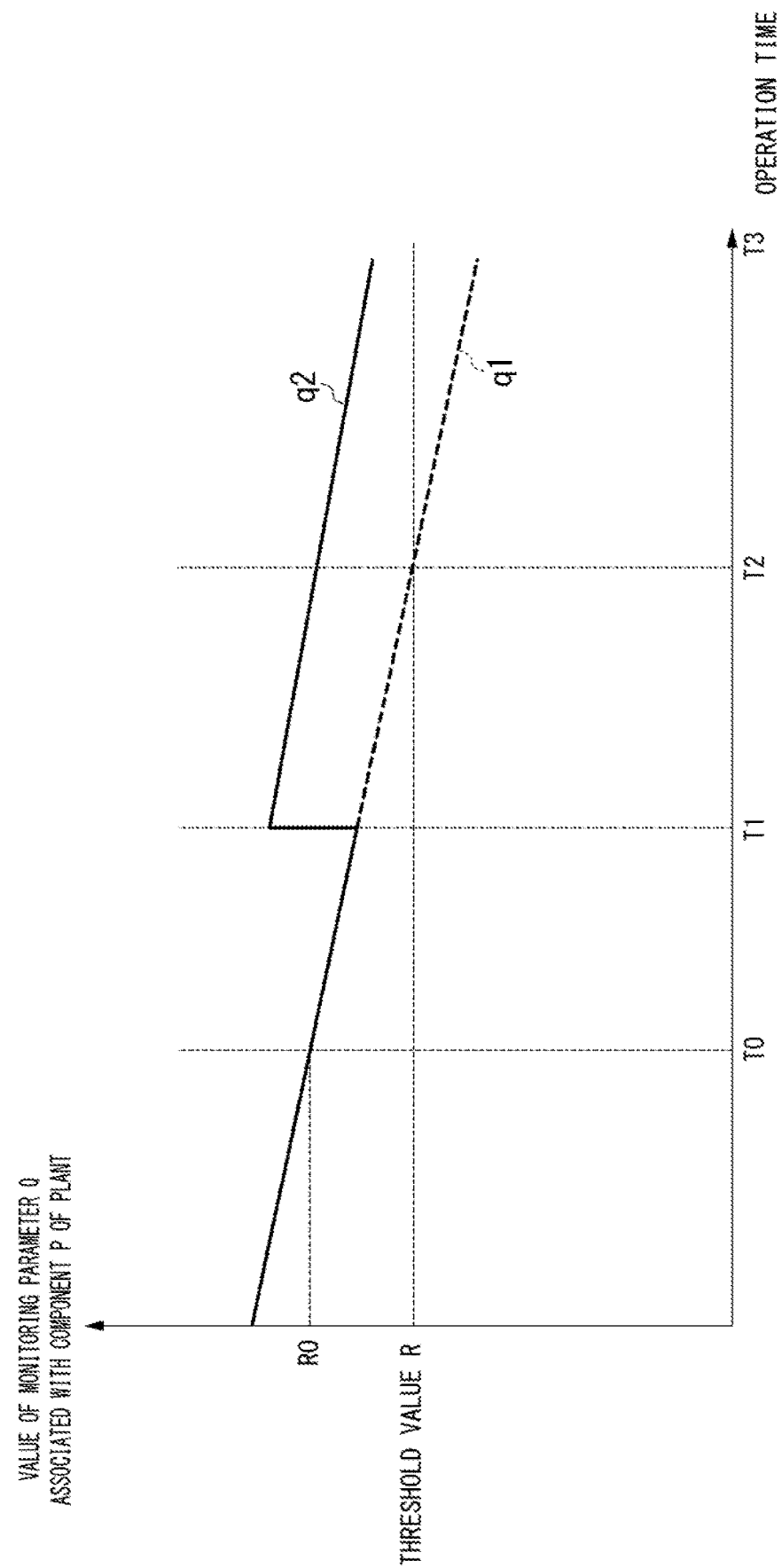
FIG. 7 is a diagram showing prediction of abnormality occurrence using the indicator detection device and an advantageous effect according to the first embodiment of the invention.

FIG. 7 is a diagram Showing prediction of abnormality occurrence using the indicator detection device and an advantageous effect thereof according to the first embodiment of the invention.

The vertical axis of a graph shown in FIG. 7 represents a value of a monitoring parameter Q for a component P which is used for a gas turbine 10, and the horizontal axis represents a cumulative operation time from starting of the operation of the gas turbine 10. For example, it is assumed that an operation plan of causing the gas turbine 10 to operate continuously at a rated load is made. In this case, values of operation data (such as an atmospheric temperature) serving as input parameters to an estimation model M in operation in the future can be calculated from past operation results. Operation history data which is input to the estimation model M is assumed to be a cumulative operation time. The current cumulative operation time is T0 and an estimated value of the monitoring parameter Q estimated by the estimation model at that time is R0. It is assumed that the component P is to be replaced when the value of the monitoring parameter Q becomes equal to or less than a threshold value R. It is assumed that the indicator detection device 30 is configured to operate in an operation mode in which a trend of the monitoring parameter is predicted in addition to an operation mode in which an indicator is detected. In the operation mode in which a trend is predicted, the indicator detection device 30 outputs an estimated value of the monitoring parameter estimated by the estimation model M in a designated period (for example, which is designated by the cumulative operation time).

Under these conditions, a planner of a maintenance schedule can plan a replacement timing of the component P as follows. For example, the planner performs inputting to the indicator detection device 30 such that the indicator detection device 30 operates in the operation mode in which a trend of the monitoring parameter Q is predicted. Subsequently, the planner inputs values of input parameters (such as an atmospheric temperature) associated with operation in the future based on past operation results and cumulative operation times T0 to T3 as a designated period to the indicator detection device 30.

Then, the control unit 34 starts a process of predicting a trend of the monitoring parameter. First, the input and output unit 36 receives the above-mentioned values, outputs the values of the input parameters to the data acquiring unit 31, and outputs the cumulative operation times T0 to T3 to the control unit 34. Then, the control unit 34 adds a predetermined period $\Delta T$ to the cumulative operation time T0 and outputs the added cumulative operation time $T0+\Delta T$ to the data acquiring unit 31. The data acquiring unit 31 outputs the input parameters and the cumulative operation time $T0+\Delta T$ to the estimation unit 32. The estimation unit 32 calculates an estimated value of the monitoring parameter Q in the cumulative operation time $T0+\Delta T$. When calculation of the estimated value is completed, the control unit 34 outputs the cumulative operation time $T0+2\cdot\Delta T$ to the data acquiring unit 31. The estimation unit 32 calculates an estimated value of the monitoring parameter Q in the cumulative operation time $T0+2\cdot\Delta T$. Similarly, the estimation unit 32 repeatedly calculates an estimated value of the monitoring parameter Q until the cumulative operation time reaches T3 while increasing the cumulative operation time by $\Delta T$. Graph q1 is acquired through this process. The planner ascertains that the monitoring parameter Q reaches the threshold value R and the component P is to be replaced when the cumulative operation time T2 elapses. For example, when it is scheduled to perform periodic check with the cumulative operation time reaching T1, the planner can plan a schedule for replacing the component P at that time. The indicator detection device 30 can predict the value of the monitoring parameter Q after the component P has been replaced in the same way (Graph q2).

Second Embodiment

Hereinafter, an indicator detection system according to a second embodiment of the invention will be described with reference to FIGS. 8 and 11.

An indicator detection device 30A according to the second embodiment will be described below. The indicator detection device 30A detects an indicator of an abnormality using a method different from that in the first embodiment. In the first embodiment, the estimation model M estimates monitoring parameters in consideration of aging deterioration of a plant. In the second embodiment, a state evaluating unit 33A evaluates monitoring parameters using an evaluation method in consideration of aging deterioration of a plant.

Figure 8:
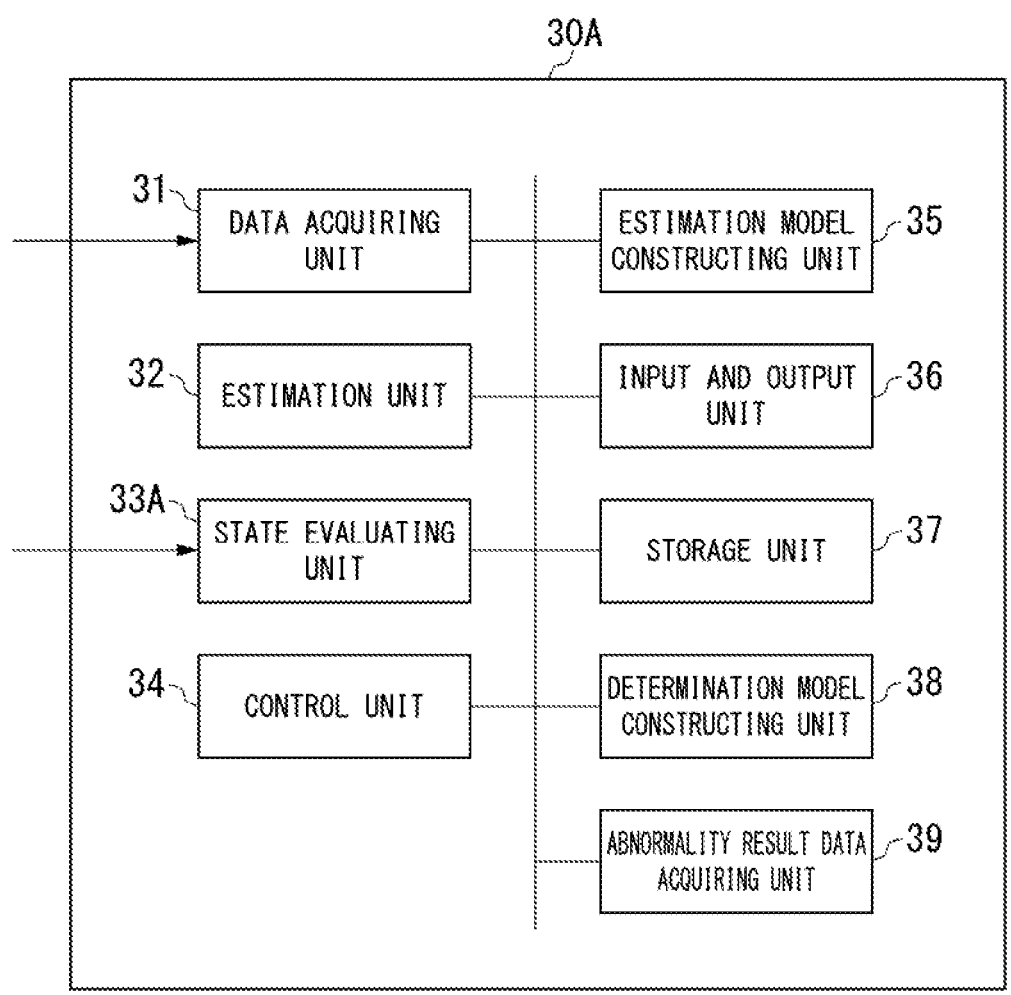
FIG. 8 is a functional block diagram showing an indicator detection device according to a second embodiment of the invention.

FIG. 8 is a functional block diagram showing an indicator detection device according to the second embodiment of the invention.

The same elements as the functional units of the indicator detection device 30 according to the first embodiment out of elements according to the second embodiment of the invention will be referred to by the same reference signs and description thereof will not be repeated. As shown in the drawing, an indicator detection device 30A includes a data acquiring unit 31, an estimation unit 32, a state evaluating unit 33A, a control unit 34, an estimation model constructing unit 35, an input and output unit 36, a storage unit 37, a determination model constructing unit 38, and an abnormality result data acquiring unit 39.

The state evaluating unit 33A acquires operation history data in addition to an estimated value and a measured value of a monitoring parameter and evaluates a state of a machine on the basis of an evaluation criterion based on operation results indicated by the operation history data.

The determination model constructing unit 38 learns the estimated value and the measured value of the monitoring parameter including data at the time of occurrence of an abnormality and the operation history data at that time and constructs a determination model for calculating an evaluation criterion based on operation results indicated by the operation history data.

The abnormality result data acquiring unit 39 acquires information such as details (a type and a scale) of an abnormality having occurred in the past, an abnormality occurrence position, a countermeasure for the abnormality, the estimated value and the measured value of the monitoring parameter at the time of occurrence of the abnormality, and operation history data at that time.

Figure 9:
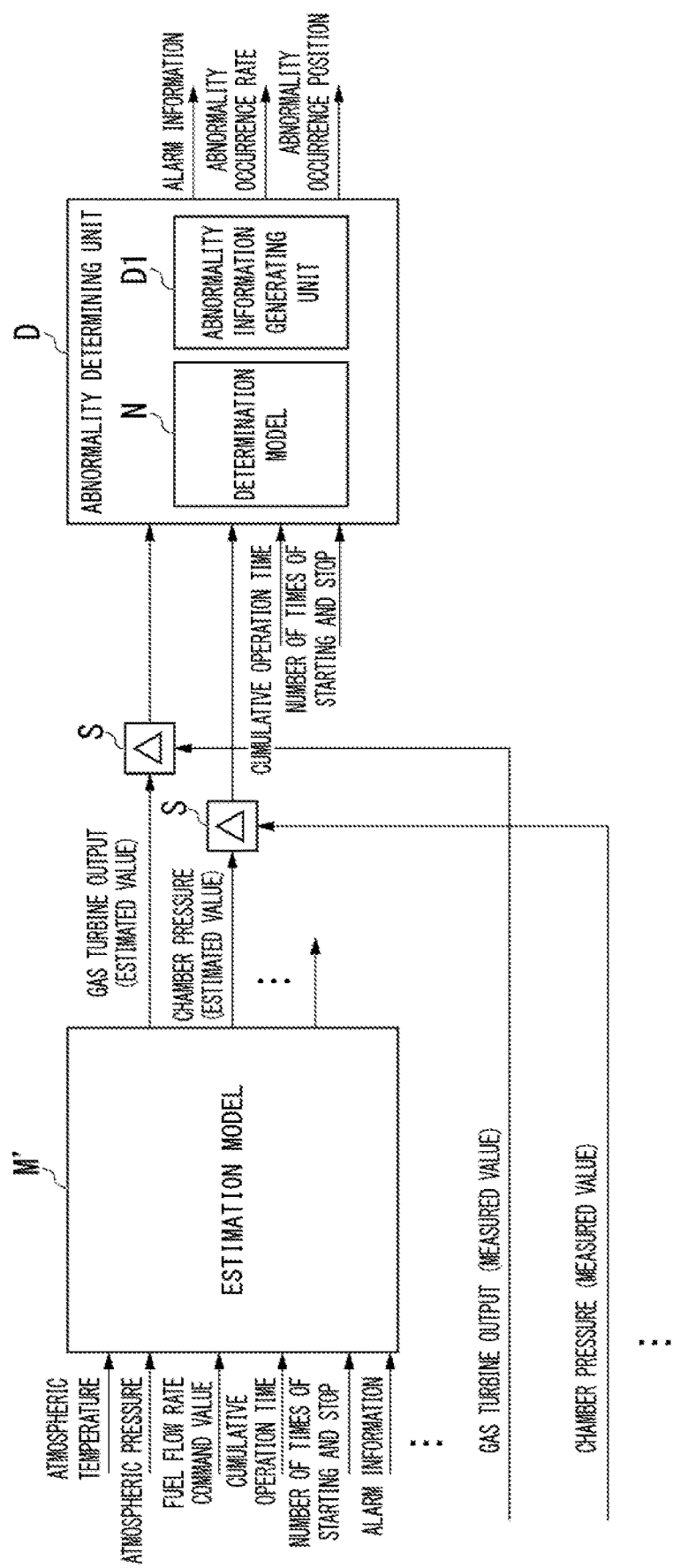
FIG. 9 is a diagram showing an indicator detecting process according to the second embodiment of the invention.

FIG. 9 is a diagram showing an indicator detecting process according to the second embodiment of the invention.

The estimation model M' or the subtractor S are the same as described above with reference to FIGS. 3 and 6. That is, the estimation model M' is an estimation model for estimating a value of a monitoring parameter based on aging deterioration on the basis of operation data at the time of normal operation in the past. The subtractor S calculates a difference between an estimated value and a measured value of each monitoring parameter and outputs the calculated difference to the abnormality determining unit D.

The abnormality determining unit D of the state evaluating unit 33A according to this embodiment includes a determination model N. The determination model N calculates an evaluation criterion at a time point at which an operation indicated by the operation history data has been performed. For example, regarding a certain monitoring parameter, it is appropriately determined there is an indicator of an abnormality when a difference between an estimated value and a measured value is "10" at a time point at which an operation service life is short. On the other hand, when the operation service life extends, for example, when the difference between the estimated value and the measured value becomes "10," it is assumed that the difference increases rapidly unlike that when the operation service life is short and an abnormality occurs earlier than that when the operation service life is short. In this case, it is appropriate that a threshold value is changed depending on the cumulative operation time (the operation history data) regardless of calculation of an estimated value of the monitoring parameter in consideration of aging deter oration using the estimation model M'. In this case, the determination model N determines that there is an indicator of an abnormality on the basis of the value of the threshold value (for example, "5") depending on the cumulative operation tune.

A model to which operation data corresponding to a predetermined period is input instead of the operation history data and which determines whether there is an indicator of an abnormality is conceivable as another example of the determination model N. For example, it is assumed that abnormalities which occur by difference patterns (difference histories) of three monitoring parameters a1, a2, and a3 are different. The determination model N stores a correlation between histories of differences between estimated values and measured values of one or more monitoring parameters (for example, the monitoring parameters a1, a2, and a3) by the estimation model M' and the abnormalities which occur actually in association with the histories of the differences. In this case, information on the differences between the estimated values and the actually measured values of the parameters a1, a2, and a3 by the estimation model M' is stored in the storage unit 37 to correspond to a predetermined period. Time-series information of differences (a history of differences) calculated by the subtractor S for one or more monitoring parameters (for example, the monitoring parameters a1, a2, and a3) corresponding to a predetermined period in the past with respect to the current time, which is stored in the storage unit 37, is input to the determination model N. The determination model N determines whether there is an indicator of an abnormality on the basis of the correlation depending on the input history of the difference in the predetermined period. Accordingly, it is possible to detect an indicator of an abnormality in consideration of change over time of a monitoring parameter.

In the above example, the operation history data is included in the input parameters to the determination model N, but at least one of alarm information and event information may be included in the input parameters to determine whether there is an indicator of an abnormality.

An example of a determination model constructing process according to this embodiment will be described below.

Figure 10:
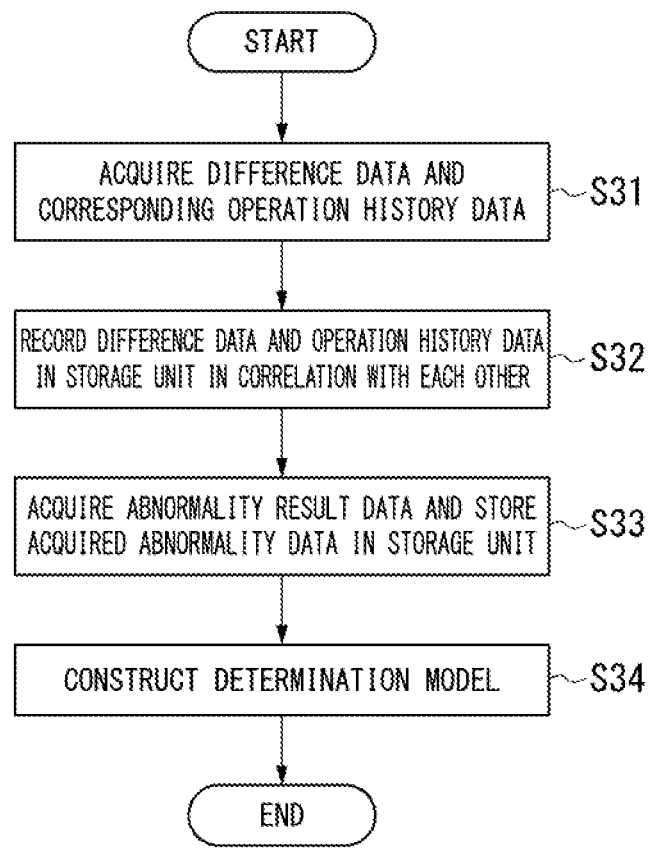
FIG. 10 is a flowchart showing an example of a determination model constructing process according to the second embodiment of the invention.

FIG. 10 is a flowchart showing an example of a determination model constructing process according to the second embodiment of the invention.

As a premise, it is assumed that what abnormality is subjected to determination of whether there is an indicator thereof on the basis of what monitoring parameter or what time point before an abnormality occurs is set as a time point at Which an indicator of the abnormality is detected is determined in advance.

First, the data acquiring unit 31 acquires difference data between an estimated value and a measured value by the estimation model M (or M') at the time of occurrence of an abnormality and in a predetermined period before the abnormality occurs and operation history data corresponding thereto (Step S31). Then, the data acquiring unit 31 stores the acquired difference data at the time of occurrence of an abnormality and the operation history data in the storage unit 37 in correlation with each other (Step S32). The abnormality result data acquiring unit 39 acquires abnormality information (such as a type, a scale, an occurrence position, and a countermeasure of the abnormality) corresponding to the difference data at the time of occurrence of an abnormality acquired in Step S31 and stores the acquired abnormality information in the storage unit 37 (Step S33). Then, the determination model constructing unit 38 constructs a determination model N (Step S34). For example, the determination model constructing unit 38 calculates a relationship between the cumulative operation time and the magnitude of the difference at the time of occurrence of an abnormality from a relationship between the history of the difference for the abnormality occurring actually and the cumulative operation time. The determination model constructing unit 38 calculates a difference at a time point which is set as an abnormality indicator detection time point in a predetermined period before the abnormality occurs, and sets the value of the difference as a threshold value for detection of an indicator of an abnormality. The determination model constructing unit 38 calculates the cumulative operation time at the time point at which the threshold value is set. The determination model constructing unit 38 stores the calculated cumulative operation time, the threshold value, and the abnormality information as a set in the storage unit 37. Accordingly, a threshold value corresponding to the cumulative operation time for the plant can be set for each type of abnormality.

Figure 11:
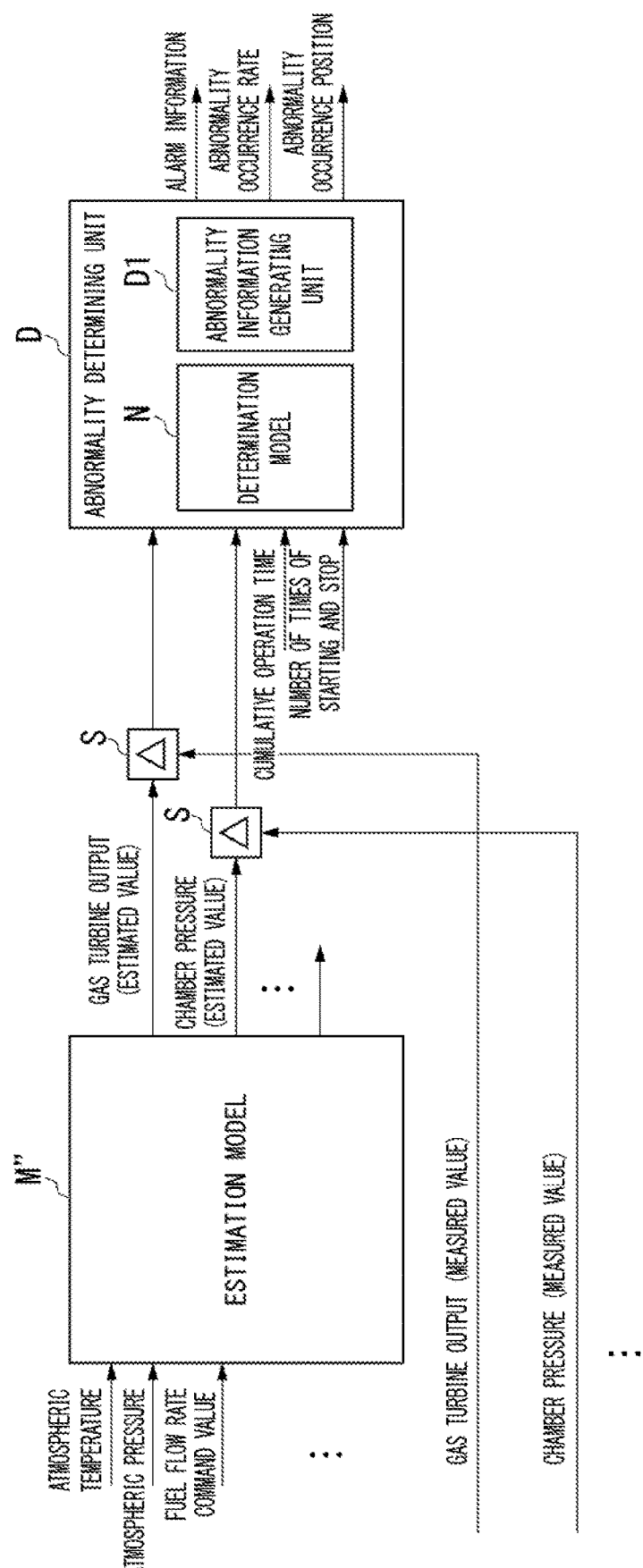
FIG. 11 is a diagram showing another example of the indicator detecting process according to the second embodiment of the invention.

FIG. 11 is a diagram showing another example of the indicator detecting process according to the second embodiment of the invention.

In the example shown in FIG. 11, operation history data is not input to an estimation model M'. On the other hand, operation history data and alarm information are input to a determination model N. As shown in FIG. 11, in general abnormality indicator detection using an estimation model in which aging deterioration is not reflected, operation history data is input for only an abnormality indicator determining process and it is determined whether there is an indicator of an abnormality on the basis of an evaluation criterion based on aging deterioration. Accordingly, it is possible, to detect an indicator of an abnormality in consideration of aging deterioration of a plant.

The type of the operation history data which is used to construct the determination model N or to determine whether there is an indicator of an abnormality is not limited to the cumulative operation time, and the types of operation history data which are described above for the estimation model M (see FIG. 3 or the like) in the first embodiment can be used.

In the indicator detection device 30A shown in FIG. 2, the indicator detection device 30A includes the determination model constructing unit 38 and the abnormality result data acquiring unit 39, but may employ a configuration in which such functional units are not provided. In this case, for example, a determination model N is constructed by another computer and the determination model N is stored in the storage unit 37.

According to this embodiment, an indicator of an abnormality can be detected on the basis of an evaluation criterion based on aging deterioration, an operation load, operation conditions, and the like of a plant. In addition, it can be modified.

In the first embodiment and the second embodiment, an indicator of an abnormality is detected on the basis of a difference between a first estimated value and a measured value of a monitoring parameter, but an indicator of an abnormality may be detected on the basis of a difference between the first estimated value and a second estimated value of a monitoring parameter using the second estimated value instead of the measured value of the monitoring parameter.

The indicator detection devices 30 and 30A are examples of an indicator detection system. The processes of the indicator detection devices 30 and 30A are stored in the form of a program in a computer-readable recording medium, and the processes are performed by causing computers of the indicator detection devices 30 and 30A to read and execute the program. Examples of a computer-readable recording medium include a magnetic disk, a magneto-optical disk, a CD-ROM, a DVD-ROM, and a semiconductor memory. The computer program may be transmitted to a computer via a communication line and the computer having received the computer program may execute the program.

The program may be designed to realize some of the above-mentioned functions.

The program may be a so-called differential file (a differential program) which can realize the above-mentioned functions in combination with a program which has been already recorded in a computer system.

The indicator detection device 30 or 30A may be constituted by a single computer or may be constituted by a plurality of computers which are communicatively connected to each other.

Elements of the embodiments can be appropriately replaced with known elements without departing from the gist of the invention. The technical scope of the invention is not limited by the embodiments, and can include various modifications and substitutions without departing from the gist of the invention.

INDUSTRIAL APPLICABILITY

With the indicator detection system and the indicator detection method according to the invention, it is possible to detect an indicator in consideration of aging deterioration of a plant or the like.

REFERENCE SIGN LIST

10 Gas turbine
15 Power generator
20 Device
11 Compressor
12 Combustor
13 Turbine
14 Rotor
16A, 16B, 16C Fuel flow rate control valve
17 IGV
30, 30A Indicator detection device
31 Data acquiring unit
32 Estimation unit
33 State evaluating unit
34 Control unit
35 Estimation model constructing unit
36 Input and output unit
37 Storage unit
38 Determination model constructing unit
39 Abnormality result data acquiring unit
A, B, C Fuel system
D Abnormality determining unit
M, M' Estimation model
P Component
Q Monitoring parameter

What is claimed is:

1. An indicator detection system comprising:
a data acquiring unit configured to acquire operation data of a machine and operation history data indicating an operation history of the machine including an operation load and operation conditions during that time in addition to a cumulative operation time of the machine;
an estimation unit configured to calculate a first estimated value of a monitoring parameter of the machine which is to be monitored based on the operation data, the operation history data, and an estimation model for estimating a value of the monitoring parameter at a time point corresponding to the operation history data for the monitoring parameter using the operation history data as an input; and
a state evaluating unit configured to evaluate a state of the machine based on a difference between the first estimated value of the monitoring parameter and a measured value or a second estimated value of the monitoring parameter included in the operation data acquired by the data acquiring unit.

2. The indicator detection system according to claim 1, wherein the operation history data includes at least one of the number of times of starting and the number of times of stopping of the machine.

3. The indicator detection system according to claim 1, wherein the operation history data includes at least one of an operation time of the machine, an operation time for each operation pattern of the machine, and an elapsed time after introduction of the machine.

4. The indicator detection system according to claim 1, wherein the operation history data includes at least one of the number of times of performing maintenance and check on the machine and an elapsed time after maintenance and check on the machine has been performed.

5. The indicator detection system according to claim 1, wherein the operation history data includes a cumulative output value of the machine.

6. The indicator detection system according to claim 1, wherein the operation data includes at least one of alarm information and event information which are generated by a device that monitors the machine.

7. The indicator detection system according to claim 1, wherein the estimation model is constructed based on operation data and operation history data of other machines of the same type as the machine in addition to the operation data and the operation history data of the machine.

8. The indicator detection system according to claim 1, further comprising an estimation model constructing unit configured to construct the estimation model based on the operation history data and the operation data of the machine at a time point corresponding to the operation history data.

9. The indicator detection system according to claim 1, wherein the state evaluating unit is configured to additionally acquire the operation history data and to evaluate a state of the machine based on an evaluation criterion of the monitoring parameter which is to be monitored and which corresponds to operation results indicated by the operation history data.

10. The indicator detection system according to claim 1, wherein the state evaluating unit is configured to predict an abnormality which is to occur in the future based on the difference and a correlation between a history of the difference and an abnormality which has actually occurred.

11. An indicator detection system comprising:
a data acquiring unit configured to acquire operation data of a machine and operation history data indicating an operation history of the machine including an operation load and operation conditions during that time in addition to a cumulative operation time of the machine;
an estimation unit configured to calculate a first estimated value of a monitoring parameter of the machine which is to be monitored based on the operation data and an estimation model for estimating a value of the monitoring parameter at a time point corresponding to the operation history data for the monitoring parameter; and
a state evaluating unit configured to evaluate a state of the machine based on a difference between the first estimated value of the monitoring parameter estimated by the estimation unit and a measured value or a second estimated value of the monitoring parameter included in the operation data acquired by the data acquiring unit and an evaluation criterion of the monitoring parameter which is to be monitored and which corresponds to operation results indicated by the operation history data.

12. An indicator detection method which is performed by an indicator detection system, the indicator detection method comprising:
acquiring operation data of a machine and operation history data indicating an operation history of the machine including an operation load and operation conditions during that time in addition to a cumulative operation time of the machine;
calculating a first estimated value of a monitoring parameter of the machine which is to be monitored based on the operation data, the operation history data and an estimation model for estimating a value of the monitoring parameter at a time point corresponding to the operation history data for the monitoring parameter using the operation history data as an input; and
evaluating a state of the machine based on a difference between the first estimated value of the monitoring parameter and a measured value or a second estimated value of the monitoring parameter included in the operation data acquired by the data acquiring unit.

* * * * *